MORGAN W. BROWN, OF NEW YORK, N. Y.

Letters Patent No. 86,639, dated February 9, 1869; antedated January 23, 1869.

IMPROVED COMPOSITION FOR ENAMELLING PAPER, CLOTH, CARD-BOARD, &c.

The Schedule referred to in these Letters Patent and making part of the same.

*To all whom it may concern:*

Be it known that I, MORGAN W. BROWN, of New York city, in the county and State of New York, have invented a new and useful Process for the Manufacture of a Composition of Matter for the Purpose of Enamelling, Coating, and Treating Paper and Paper Card-Board, &c.; and I do hereby declare that the following is a full and exact description thereof.

The nature of my invention consists in the preparation and use of a composition of matter, which I prepare from any soluble alkaline silicate, but prefer the silicate of soda or potash, and cryolite, chloride of lime, and glycerine, with which I treat and prepare the surfaces of card-board, and also paper of any kind, to enamel, or glaze, saturate, or coat the same therewith, for the purpose of applying the paper and card-board to various useful purposes.

The same being insoluble in water, I use it for preparing erasive tablets with white surface, for lead-pencil or other pencil-uses, and the dark or colored surfaces for slate-pencil tablets, books, boards, &c.; also for book-binders' board, straw-board, pasteboard for boxes of the various kinds, business-cards, and leaves and sheets of paper, tags, and other purposes and uses where an enamel, or glaze, that will resist water or dampness, in its application to card-board and paper, is of practical utility; also, for paper used in the manufacture of collars, cuffs, &c., as the composition of matter used is perspiration-proof, and inodorous as well as non-combustible.

To enable others skilled in the art to make, prepare, and use my invention, I will proceed to describe the process of manufacture, and the preparation and treatment of the chemical substances, preparatory to and for the purposes herein set forth.

First. I take the gelatinous or liquid alkaline silicate of commerce, and dilute it with water so that the specific gravity will be from about 20° to 22° Baumé. I heat this in any suitable vessel to the boiling point. I now use one pound of chloride of lime (previously dissolved in about three gallons of warm water) to every one hundred gallons of the alkaline silicate in the vessel under treatment. I now boil the whole mass from twenty to thirty minutes, keeping it well agitated and stirred. I now let the heat subside, and the contents of the vessel settle.

Second. I now draw or dip off the clear solution, and clean out the sediment from the vessel, and return the clear solution back into the vessel again, and bring the heat up to the boiling-point. I now add from eighteen to twenty pounds of finely-pulverized cryolite, and from two to three gallons of cold water to every one hundred gallons of the solution in the vessel under treatment. Now agitate and boil the whole well together for one hour. Then let settle, and draw off the clear solution from the vessel.

Third. I add, to every one hundred gallons of the above-prepared alkaline silicate, about fifteen pounds of white concentrated glycerine, (previously diluted to about 10° specific gravity, Baumé, with hot water.) I admix this very thoroughly, and use or apply the prepared solution to the surfaces of paper card-board, &c., at from about 18° to 25° specific gravity, in one or in several coatings, as may be deemed most practical, but I find 20° in most cases the best density for applications. Where it is too thick, I always use warm or hot water to thin it with.

Fourth. I use, in the prepared solution or composition of matter, any perfume, where the nature of the application to cards or to paper may require its use. Also stains or colors may be used in admixture with the composition of matter, before its application to the paper, card-board, &c.

I do not confine myself to exact proportions of the materials used, or to the number of degrees of the specific gravity of the solutions, but just such proportions as I have herein described, I find to answer the best purposes.

I find that this composition of matter is applicable to most kinds of paper and card-board, whether previously sized or glazed with other preparations, or not, and its application to textile fabrics I claim as useful, protecting the same from combustion in. As a waterproofer, the glycerine used in the composition renders paper and cloth more pliable and durable.

What I claim as my invention, and desire to secure by Letters Patent, is—

The above composition of matter, substantially as described, and its use and application for enamelling and coating card-board, paper, &c., for the uses and purposes herein specified and set forth.

MORGAN W. BROWN.

Witnesses:
FRANK E. BLACKWELL,
C. P. STIMETS.